March 7, 1933.   E. RAFFLOER   1,900,667
METHOD FOR DESULPHURIZING GASES
Filed Aug. 19, 1932   2 Sheets-Sheet 1

Fig_1

Emil Raffloer
INVENTOR:
BY Paul S Eaton
ATTORNEY.

March 7, 1933.  E. RAFFLOER  1,900,667
METHOD FOR DESULPHURIZING GASES
Filed Aug. 19, 1932  2 Sheets-Sheet 2

INVENTOR:
Emil Raffloer
BY
Paul S. Eaton
ATTORNEY.

Patented Mar. 7, 1933

1,900,667

UNITED STATES PATENT OFFICE

EMIL RAFFLOER, OF DUISBURG, GERMANY, ASSIGNOR TO CHARLOTTE CHEMICAL LABORATORIES, INC., OF CHARLOTTE, NORTH CAROLINA, A CORPORATION OF NORTH CAROLINA

METHOD FOR DESULPHURIZING GASES

Application filed August 19, 1932, Serial No. 629,407, and in Germany May 19, 1931.

This invention relates to a new and improved method and means for purification of gas in which the rate of flow of the gas thru the purification apparatus is greatly increased and also means are provided for extracting the sulphur from the used purification mass economically and in such a manner as to cause the sulphur to be pure and commercially usable and at the same time the purification mass is not injured but on the contrary is freed of the sulphur and ready for re-use.

In the usual way of desulphurizing of gases, it is customary to pass the gases thru several tanks which are arranged in series and in which the loose purification mass—on account of its high resistance—is arranged in shallow beds on wooden supports. The capacity of these purification tanks are very small when compared with the large space they require. The desulphurizing of large gas quantities will therefore require very large plants.

Other disadvantages of this kind of purification plants are, for instance, to be found in the lack of uniformity in the gas distribution and the uneven load on the purification mass in the tanks, the large pressure drop of the gases, the difficulty in charging and discharging of the tanks, and the high construction and operation of cost, etc.

All previous experiments in regard to the recovery of elementary sulphur from purification mass in such a way that this sulphur could compete with natural sulphur have failed due to the high construction and operating cost of the plants required for the extraction. So far one has been satisfied by roasting the purification mass in sulphuric acid plants in order to recover the $SO_2$ gas. By this roasting process the purification mass is heated so high, however, that it is not suitable for further use in desulphurizing.

Heretofore, it has been the practice to remove sulphur by means of solvent. The reason for this has been that other methods for removal of sulphur such as distillation would make the purification mass unsuitable for the use.

It has now been found when using purification mass in briquette form that it is possible to distil the sulphur by means of neutral gases at a temperature lower than usually required for distillation of sulphur so that the chemical and physical properties of the purification mass is maintained unchanged and in this case the purification mass can be re-used.

I have found that the removal of the sulphur from the briquettes can be practiced commercially between temperatures of 350 degrees and 550 degrees F. Straight distillation of sulphur requires a temperature in the neighborhood of 800 degrees to 900 degrees F.

By distillation of the briquettes with neutral gas, only enough oxygen is admitted to the burner within the distillation apparatus as will be completely burned in the combustion of the gas and no oxygen will be allowed to contact with the briquettes.

The object of this invention is to avoid these disadvantages by using the purification mass not as loose powder but in form of hard porous bodies arranged in deep beds in containers of any design without the use of wooden shelves.

In order to prepare this kind of gas mass bodies, the loose purification mass is mixed with suitable materials to make it hard and porous. The bodies are now made in regular form as, for instance, balls, cylinders, cubes, briquettes, etc., and from this plastic mass, good satisfactory bodies for desulphurizing of gases have been made from a mixture of purification mass with water and suitable fillers and binders such as fine sawdust, cement, which, being heat-hardened, are very porous and have a good sulphur absorption power. Equally good bodies can be made from mixtures of purification mass with sulphite liquor, a waste product from the pulp industry. Purification mass is usually bog ore such as $Fe(OH)_3$. The briquettes formed from this mixture are heated by which the sulphite liquor is evaporated and the briquettes hardened and made porous by the formation of bubbles by the sulphite liquor.

Such briquettes as made from purification mass, have also been made by addition of a small amount of powdered carbide (calcium carbide $CaC_2$) and gypsum or cement with water. The acetylene gas, which is formed by contact with the water will develop small bubbles and make the body porous. The remaining lime hydrate and the cement will give the body the required strength.

Experiments have proven that the sulphur absorbing power is equally as good as that obtained by the loose powdery purification mass. When using these bodies for the desulphurizing it is possible to operate with a high gas velocity of 100 and more mm. per second, while with the loose powdery purification mass as heretofore used, only a gas velocity of only 5 to 10 mm. per second could be allowed.

It follows that this means a saving in space and of construction cost of the desulphurizing plant and that the plants can be small. By the use of purification mass in lumps or briquettes the cost of construction and operation of the purification plant will be low.

The gas distribution in the purifiers is also uniform and the pressure drop of the gases will only amount to a fraction of that resistance which the well known purification boxes are now giving. The charging and discharging of the purifiers with purification mass in lump form briquettes is also simple and easy. From time to time a given amount of mass saturated with sulphur is withdrawn from the bottom thru openings and an equivalent amount of new and fresh briquettes are charged from above.

The gas enters at the bottom into a purifier and leaves at the top, while the purification mass is moved in counter-current to the gas from above and to the bottom of the purifier.

In order to avoid a drying out of the ordinary gas mass, which may render the mass unsatisfactory, usually a small amount of steam is added to the gas in the purifiers, but the effect is incomplete.

With the briquette mass, however, it is possible to spray it continuously or intermittently with water or other solutions. This would not be possible with powdery mass as it would form a sludge which would not let the gas thru.

Another advantage of the briquette mass is that the sulphur content in the mass can be recovered in elementary form at the factory site and that the mass can be reused for further desulphurizing. The sulphur recovery from the briquettes mass can be made in the purification apparatus as well as in special apparatus. This recovery is made in the simplest and cheapest way by distilling the briquette mass with hot neutral waste gases whereby the sulphur is obtained in pure state.

Due to the possibilities of sulphur recovery from the briquette mass and the continued reuse of the mass for further sulphur recovery the operating cost of the desulphurizing will be small as compared with processes heretofore employed. This is for purification of large gas quantities of very large economical value.

A gas purification plant for carrying out the process in accordance with the present invention, consists of a plurality of purifiers for example, two, which are connected with each other with pipe lines and valves for changing of the gas flow. While in the one purifier the desulphurizing is accomplished, the regeneration of the gas mass takes place in the other purifier by air which is passed therethrough. The switching of gas to air, and vice versa, takes place at longer or shorter intervals of time, as required. The discharge of used sulphur containing briquettes and the charging of fresh briquettes takes place also with longer or shorter intervals of time as required. The purifiers can also be arranged parallel or in series. In this case the air for the regeneration is added to the purification gas as is practiced by the gas works today.

The present invention represents, therefore, an important improvement which mainly is due to the economy of the process.

One of the main advantages of the use of briquettes in the apparatus shown and described is that it is possible to use a very deep mass in the purifiers, whereas, in using the purification mass in loose form it has been necessary to have a very thin layer.

Some of the objects of the invention having been stated, other objects will appear as the description proceeds when taken in connection with the accompanying drawings, in which—

Figure 1:
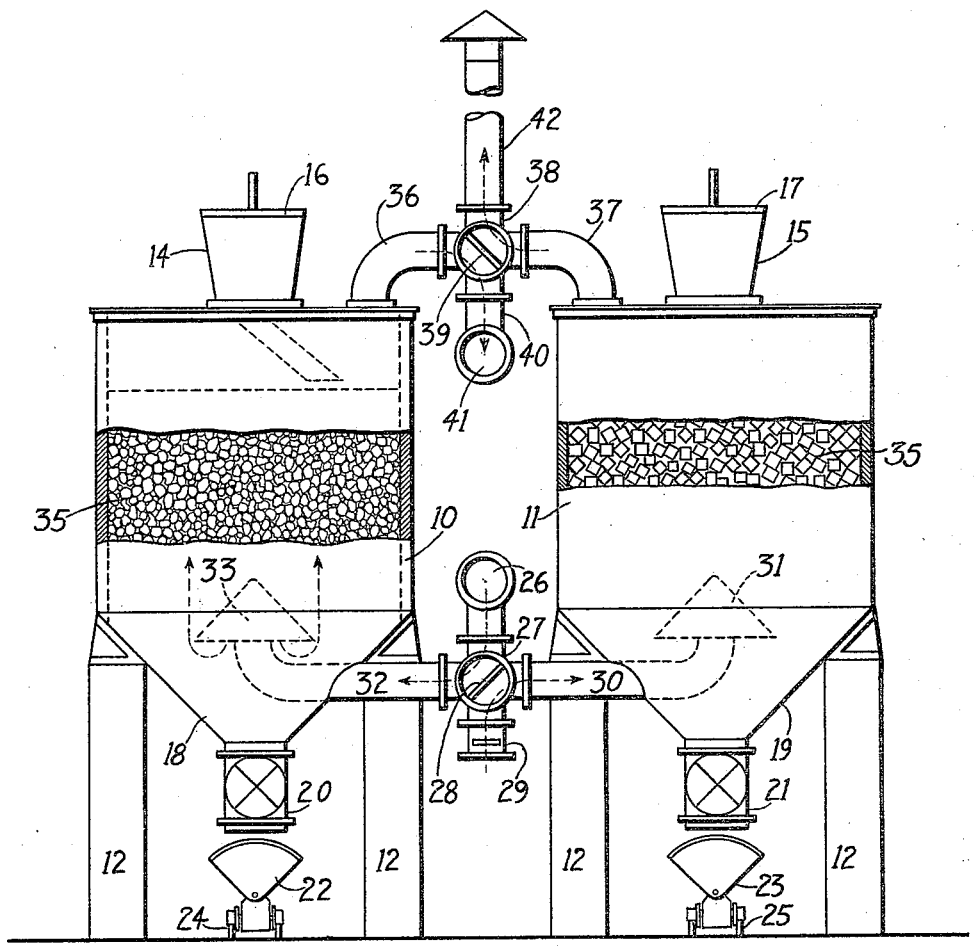
Figure 1 is an elevation with parts broken away showing one form of apparatus capable for use in carrying out my method.

Referring more specifically to the drawings, Figure 1 shows a form of apparatus which may be used in carrying out my improved method and in which I have the retorts or containers 10 and 11 which are identical and being mounted on any suitable supports 12 and having funnel portions 14 and 15 closed by suitable lids 16 and 17 and having funnel shaped portions 18 and 19 having discharge valves 20 and 21 respectively for emptying into a car and the like 22 or 23 as the case may be adapted to run on tracks 24 or 25, whereby the purification mass may be removed from the containers 10 and 11.

The unpurified or raw gas is conducted to the apparatus thru a suitable pipe 26 which is connected to a two-way valve 27 of any suitable structure and being provided with a vane 28. The valve communicates with the atmosphere by means of pipe 29, and a pipe 30 leads into container 11 and the end thereof is covered by an inverted funnel shaped member 31.

Pipe 32 leads from the other side of valve 27 into container 10 and its upturned end portion is covered by a funnel shaped member 33 so that the gas introduced into the containers is deflected downwardly and then carried upwardly thru the purification mass.

The purification mass may be of any suitable form such as square briquettes, rectangular briquettes, cylindrical briquettes and in fact any suitable shape, while in the drawings, the briquettes are shown as being in a mass of irregular lumps and are indicated by reference character 35. It is to be understood that retort 11 is, likewise, filled with the purification mass from top to bottom as well as retort 10 although only a portion of the purification mass is shown. The top of retorts 10 and 11 have pipes 36 and 37 leading therefrom to a four-way valve 38 having a vane 39 therein and a pipe 40 leads from said valve to pipe 41 into which the purified gas is led to be conducted to suitable storage tanks and the like ready for immediate use. Exhaust pipe 42 is also connected to valve 38.

By the above arrangement, it is seen that with the valves 27 and 38 turned as shown in the drawings, the raw gas in pipe 26 is introduced thru pipe 32 into retort 11 and is conducted upwardly thru the purification mass and thru pipe 36 and thru valve 38 and into pipe 41 and while this operation is being carried out retort 11 with the briquettes therein which have previously been used for desulphurization of the gas is allowed to have introduced therethrough a continuous stream of air whereby the oxidization is effected, the sulphur liberated, and the oxide revivified on account of the fact that air passes thru pipe 29 and pipe 30 upwardly thru the mass of briquettes in retort 11 and out thru pipe 37 and thru vent or exhaust pipe 32, while at the same time raw gas is being passed thru retort 10 for purification purposes.

Figure 2:
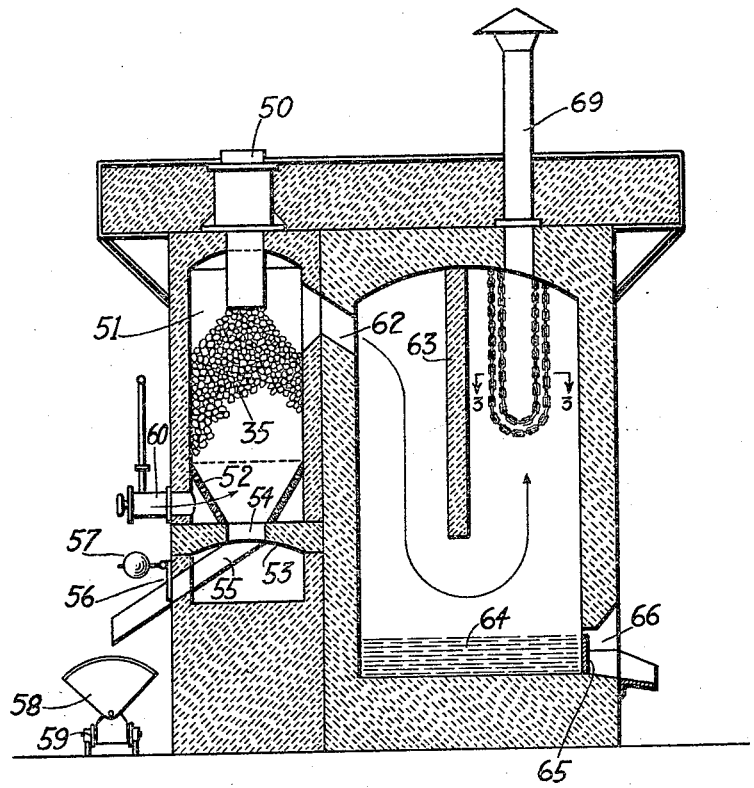
Figure 2 is a vertical sectional view showing a form of apparatus for distilling the purification mass.
Figure 3:
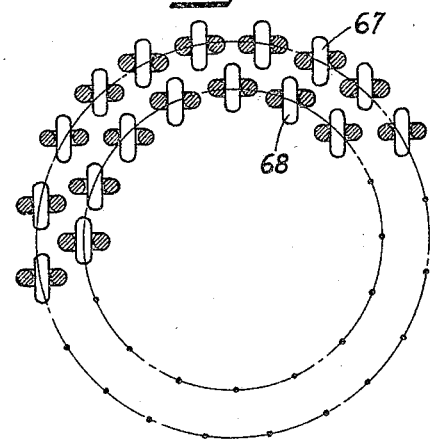
Figure 3 is an enlarged sectional view taken along the line 3—3 in Figure 2.

When the briquettes in retorts 10 or 11 as the case may be are thoroughly impregnated with sulphur to the point where their efficiency is impaired, then these briquettes are dumped thru valve 20 into car 22 and conveyed to the apparatus shown in Figure 2 and introduced thru charging opening 50 into the distilling apparatus having a chamber 51 with a funnel shaped perforated member 52 in the bottom thereof supported by a suitable support 53 having an opening 54 therein and a spout 55 leading to the exterior of the apparatus normally closed by a door 56.

Door 56 is held in closed position by a ball weight 57 and spout 54 is adapted to empty the briquettes into a suitable container such as car 58 mounted on track 59.

A suitable burner, such as a gas burner 60, is provided whereby heat may be applied to the briquettes 35 which extend all the way to and into opening 54 although only a portion of the same are shown in the drawings. The briquettes may be moistened in the distilling operation and heat applied to the briquettes causes the sulphur to be extracted from said briquettes and to pass thru an opening 62 and strike against a wall or partition member 63 to be deflected downwardly where the sulphur is reduced and lodges as at 64 and flows over a dam 65 thru opening 66 into a suitable container, not shown, where it is recovered in commercial form.

The sulphur fumes passing thru opening 62, are adapted to pass thru a suitable screen or filter after a goodly portion of the sulphur is extracted therefrom which permits dust and certain fumes to pass therethrough but prevents sulphur from passing therethrough as the sulphur will lodge on the filter, and in the drawings, I have shown it as comprised of a ring of outer chains 67 and a row of inner chains 68 having links of suitable size and being spaced apart from each other a suitable distance to allow dust and certain fumes to pass therethrough but preventing the sulphur from passing therethrough and causing the sulphur to lodge on said chains.

The fumes and dust which pass thru filter composed of any suitable means such as chains 67 and 68 pass outwardly thru a vent pipe 69 into the open air.

It is thus seen that I have provided an apparatus for the purification of gas in which the purification mass is briquettes or other suitable form so it can be easily handled, can be aerated in one container for being used in another container and when fully charged with sulphur can be transferred to a distilling apparatus to remove therefrom the sulphur so the briquettes may be used over and over again.

I claim:

1. That process of extracting sulphur from gases which comprises passing the gases thru a container having therein a purification mass comprising a deep bed of porous briquettes or lumps of the purification mass of sufficient mechanical strength to withstand a distillation process without disintegrating and being composed of cement, ferric oxide and a suitable filler at a rate in excess of 20 mm per second, then cutting off the gas from the first purification mass and passing it thru a container having therein a second bed of lumps of purification mass and at the same time passing air thru the first purification mass, repeating the above described operation until the purification mass is loaded with sulphur beyond the point of efficiency, then removing the purification mass from the purification containers and placing the same in a distillation apparatus having an exhaust portion communicating with the atmosphere and subjectng the purification mass to a temperature ranging between 350 degrees F. and 490 degrees F., produced by a neutral gas to extract therefrom the sulphur, then withdrawing the purification briquettes from the distillation apparatus and placing the purification mass in said containers and repeating the operation.

2. That method of extracting sulphur from gases which comprises forming a purification mass comprising cement, ferric oxide and a suitable filler into porous lumps such as briquettes and the like and having sufficient mechanical strength to withstand a distillation process without disintegrating, providing a plurality of containers, placing a deep bed of the mass into each of the containers, forcing the gas thru some of the containers and at the same time causing air to pass thru other of the containers and the mass therein, switching the gas thru the containers which have had air passed therethrough and at the same time allowing air to pass thru the containers which have had the gas passed therethrough, repeating the above described operation until the lumps of mass have become saturated with sulphur from the gas, removing the lumps of mass from the purification containers and placing them into a distillation apparatus having an exhaust communicating with the atmosphere, heating the lumps in the distillation apparatus with a neutral gas to a temperature ranging from 350 degrees F. to 490 degrees F. for a length of time sufficient to distil therefrom the sulphur, catching the sulphur extracted from the mass in commercial form and then again placing the purification mass back into the purification containers for re-use.

3. That process of extracting sulphur from gas which comprises forming a purification mass comprising cement, ferric oxide, and a suitable binder into porous lumps and having sufficient mechanical strength to withstand a distillation process without disintegrating, placing the lumps in a pair of containers connected in parallel, passing air thru one container and at the same time passing the gas thru the other container, spraying the lumps with water while the gas is passing therethrough, switching the gas to force it thru the other container and at the same time forcing air thru the first container, repeating the above described operation until the lumps are charged with sufficient amount of sulphur to render them inefficient, removing the lumps from the containers and placing the same in a distillation apparatus having an exhaust vent communicating with the atmosphere and being sealed at all other points to prevent entrance of oxygen thereinto and subjecting the lumps to a temperature of from 350 degrees F. to 490 degrees F. generated with a neutral gas to extract the sulphur therefrom and at the same time reclaiming the extracted sulphur in commercially pure form.

4. The process of extracting sulphur from gas which comprises providing a plurality of containers filled with porous lumps of purification mass having sufficient mechanical strength to withstand a distillation process without disintegrating and containing cement, ferric oxide and a suitable filler, connecting the containers by pipes in parallel, conducting the gas thru said pipes and thru some of said containers to cause the purification mass in said containers to absorb the sulphur from the gas, then causing the gas to flow thru the other containers and the purification mass therein and at the same time causing atmosphere to flow thru the containers not having gas passed therethrough, repeating the operation until the purification mass in the containers are impregnated with sulphur to a certain degree, then removing the mass from the containers and placing the same in a distillation apparatus sealed to exclude oxygen during distillation and subjecting the mass to heat generated by a neutral gas to bring the temperature of the mass to a temperature of between 350 and 490 degrees Fahrenheit to liberate therefrom the sulphur and filtering and condensing the sulphur fumes to reclaim the sulphur in commercial form without injuring the mass whereby the mass can again be used.

5. That process of removing sulphur from gas which comprises forming a purification mass into porous lumps whose ingredients comprise ferric oxide, cement and a suitable filler and having sufficient mechanical strength to withstand a distillation process without disintegrating, providing a plurality of separated batches of the mass and alternately passing gas and atmosphere thru said batches of mass, then placing the mass in a disillation apparatus, when it has absorbed sulphur beyond a given point and subjecting it to the distilling action of a neutral gas at a temperature below 500 degrees Fahrenheit and excluding oxygen from contact with the mass during distillation whereby the mass is freed of sulphur and ready for reuse in its original form for removing sulphureted hydrogen from gas.

6. That method of removing sulphur from gas which comprises forming a purification mass into porous lumps having sufficient mechanical strength to withstand a distillation process without disintegrating and comprising ferric oxide, cement and suitable filler and placing the mass into a plurality of containers, alternately passing gas and air thru the containers until the mass has been impregnated with free sulphur beyond the point of efficiency for purifying the gas, then placing the mass into a distilling apparatus sealed to exclude oxygen during the distillation operation and subjecting the mass to ignited neutral gas while holding the temperature within the distillation apparatus below 500 degrees Fahrenheit to free the mass from sulphur without injury to the mass and recovering the sulphur in commercial form in the distillation apparatus.

In testimony whereof I affix my signature.

EMIL RAFFLOER.